Nov. 13, 1962    E. R. ZEEK    3,063,342
OSCILLATING REAR VIEW MIRROR
Filed March 3, 1960

INVENTOR
ELWOOD R. ZEEK
BY
*Ernest ? Jensen*
ATTORNEY

3,063,342
OSCILLATING REAR VIEW MIRROR
Elwood R. Zeek, 14 Hamilton Drive E.,
North Caldwell, N.J.
Filed Mar. 3, 1960, Ser. No. 12,539
2 Claims. (Cl. 88—93)

The present invention relates to rear view mirrors or scanning devices for vehicles such as automobiles, for example, and more particularly to such mirrors which can scan a wide area.

One of the objections to rear view mirrors which are adjacent the windshield in front of the operator or outside of an automobile is that the operator can only see a reflection of a narrow area behind him. Attempts have been made to provide a wider area of rear view vision by increasing the length or width of the mirror or by providing a longer or wider mirror having a concave or convex surface facing the driver. Such mirrors are difficult to mount for adjustability, and, if the curvature of the mirror is such that there is an appreciable increase in the width of the area of vision, the view becomes distorted. Also to facilitate getting a better rear view an automobile usually has two mirrors, one inside and one outside, both covering different areas. It takes appreciable time to view both mirrors during which time the operator's eyes must be off the road ahead, and thereby increasing the possibility of accidents occurring in heavy traffic or when driving at high speed.

Accordingly, an object of the present invention is to provide a rear view mirror or scanning device which will give the operator of a vehicle the maximum rear view information in the minimum of time, thereby reducing to a minimum the amount of time the operator's eyes must be off the road or traffic ahead.

Another object is to provide such a mirror which moves in about the same manner the operator turns his head or rolls his eyes in scanning the view in front of the vehicle.

A further object is to provide such a mirror which is simple, practical and economical in construction, and reliable in operation.

Other and further objects of the invention will be obvious upon an uderstanding of the illustrative embodiment about to be described, or will be indicated in the appended claims, and various advantages not referred to herein will occur to one skilled in the art upon employment of the invention in practice.

Figure 1:
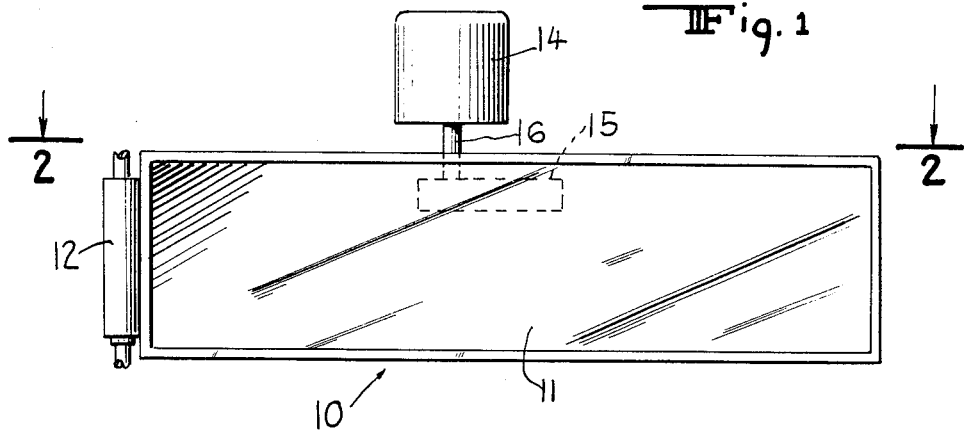
FIG. 1 is an elevational view of apparatus in accordance with the present invention.
Figure 2:
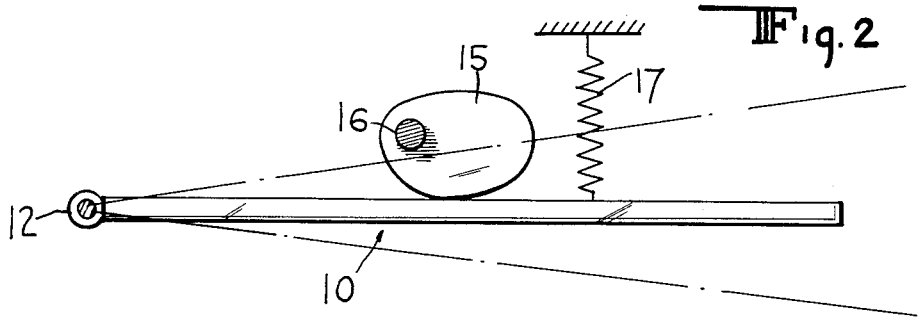
FIG. 2 is a sectional view taken along the line 2—2 on FIG. 1.

Referring to the drawing in detail, there is shown in FIGS. 1 and 2 apparatus which comprises a flat upright 10 mirror or the like having a reflective surface 11 on one side thereof, means 12 for pivotally mounting the mirror for movement about a generally vertical axis, motor means 14, a cam 15 on a shaft 16 driven by the motor for turning the mirror about its pivotal axis, and a return spring 17 for the mirror to cause the same to oscillate back and forth.

Preferably, the motor rotates slowly, for example at about 20 revolutions per minute and the cam is constructed and arranged to oscillate the mirror through an arc of about 20 degrees to simulate scanning the rear view in the same manner the operator of the vehicle scans the roadway in front of him by rolling his eyes or turning his head back and forth. Such oscillation considerably increases the width of rear view vision.

Figure 3:
FIG. 3 is a top view of another form of mirror.
Figure 4:
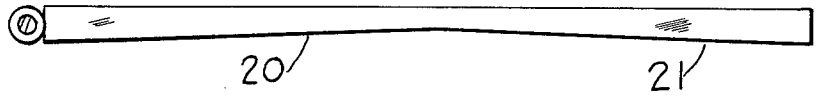
FIG. 4 is a top view of still another form of mirror.

Instead of being flat, the mirror could have two surfaces 18 and 19 (FIG. 3) or 20 and 21 (FIG. 4) disposed at an angle or the mirror could have a convex or concave surface, respectively, if desired.

It is contemplated that the motor could be driven electrically from the vehicle battery or by a pump driven by the motor of the vehicle, that the speed of the motor could be adjusted as the operator desires and that the motor could be shut off for night driving. It is further contemplated that the mirror could be adjusted to tilt the same in a desired generally upright or rearwardly facing position when the motor is shut off, if it is desired not to turn the mirror while driving at night.

From the foregoing description, it will be seen that the present invention provides simple, practical and economical apparatus for scanning the rear view across a wider area without any effort or discomfort on the part of the operator of the vehicle.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a rear view mirror for the interior of a vehicle, an oblong mirror adapted to be positioned in front of the operator and above the eye level of the operator and having a reflective surface and having its major axis disposed in a substantially horizontal plane, means for pivotally mounting said mirror to position its reflective surface in a generally upright position and for movement about a generally vertical axis, motor means, and means driven by said motor means and in operative connection with said mirror for continually oscillating said mirror back and forth about its pivotal axis through an arc of about 20° with the major axis of said mirror disposed in said horizontal plane, said motor means and said means driven by said motor means being constructed and arranged to effect such oscillation about 20 times per minute to simulate scanning by the operator accomplished looking from side to side whereby the operator can scan the roadway in back of him in such manner while glancing at said mirror at intervals.

2. Apparatus according to claim 1, wherein said driven means includes a rotary cam for engaging said mirror at the side opposite said reflective surface to move the mirror in one direction, and spring means for maintaining said mirror in engagement with said cam, whereby movement of said mirror in the opposite direction is effected.

References Cited in the file of this patent

UNITED STATES PATENTS

| | | |
|---|---|---|
| 2,514,989 | Buren | July 11, 1950 |
| 2,705,904 | Tagliaferri | Apr. 12, 1955 |
| 2,718,175 | Gim | Sept. 20, 1955 |
| 2,862,420 | Hazelroth | Dec. 2, 1958 |
| 2,871,761 | Snyder | Feb. 3, 1959 |
| 2,877,686 | Foster | Mar. 17, 1959 |

FOREIGN PATENTS

| | | |
|---|---|---|
| 839,129 | France | Dec. 26, 1938 |